United States Patent
Hachiyama et al.

(10) Patent No.: US 7,466,862 B2
(45) Date of Patent: Dec. 16, 2008

(54) IMAGE EXPANSION AND DISPLAY METHOD, IMAGE EXPANSION AND DISPLAY DEVICE, AND PROGRAM FOR IMAGE EXPANSION AND DISPLAY

(75) Inventors: Hiroki Hachiyama, Kyoto (JP); Keiichi Tsumura, Hyogo (JP); Kenji Takahashi, Shiga (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 10/885,789

(22) Filed: Jul. 8, 2004

(65) Prior Publication Data

US 2005/0008236 A1    Jan. 13, 2005

(30) Foreign Application Priority Data

Jul. 8, 2003    (JP)    ............... 2003-271770

(51) Int. Cl.
*G06K 9/36*    (2006.01)
(52) U.S. Cl. ....................... 382/232; 382/233
(58) Field of Classification Search ................ 382/232, 382/233, 235, 244–247; 341/50; 358/450
See application file for complete search history.

(56) References Cited

U.S. PATENT DOCUMENTS

| 5,581,481 | A | * | 12/1996 | Weerackody et al. | ........... | 341/50 |
| 6,947,599 | B2 | * | 9/2005 | Takemura | .................... | 382/232 |
| 2002/0039202 | A1 | * | 4/2002 | Hachiyama et al. | ......... | 358/450 |

FOREIGN PATENT DOCUMENTS

JP    7-23378    1/1995

* cited by examiner

*Primary Examiner*—Duy M Dang
(74) *Attorney, Agent, or Firm*—McDermott Will & Emery LLP

(57) ABSTRACT

A header information analysis section analyzes header information of a compressed image file and reads an original image size while comparing the read original image size and an image size required for display and performing an operation of a size ratio. A JPEG expansion section expands image data of the image file by MCU. A resizing section magnifies or reduces by MCU the image data expanded by the JPEG expansion section according to the size ratio obtained by the header information analysis section and transfers the magnified or reduced data to a display frame memory.

5 Claims, 4 Drawing Sheets

IMAGE EXPANSION AND DISPLAY METHOD, IMAGE EXPANSION AND DISPLAY DEVICE, AND PROGRAM FOR IMAGE EXPANSION AND DISPLAY

CROSS-REFERENCE TO RELATED APPLICATION

This application claims priority under 35 U.S.C. §119(a) on Japanese Patent Application No. 2003-271770 filed on Jul. 8, 2003, the entire contents of which are hereby incorporated by reference.

BACKGROUND OF THE INVENTION

The present invention relates to an image expansion and display technique for expanding a JGEG compressed digital image data and outputting the data to a monitor built in a system or an external display device.

In recent years, a wide range of image sizes for a small size image having a small capacity and a small angle of view, represented by a VGA size image, and a large size image having a large capacity and a large angle of view, reputed to have an increased number of pixels and high image quality accompanied with increase in the number of pixels of imaging devices, have been dealt with in the digital still camera industry, the camera-equipped cellular phone industry and like industry. That is, the range of a data amount to be dealt with in such industries keeps on expanding. When a large size image having a large capacity and a large angle of view is to be processed in an apparatus which is optimized for a small size image having a small capacity and a small angle of view, a large-capacity image frame memory region which is proportional to an image size is necessary.

FIG. 4 is a block diagram illustrating the configuration of a known image expansion and display device. In FIG. 4, a header information analysis section 51 analyzes header information of a compressed image file FL which is JPEG compressed and recorded on a recording medium or the like and reads an image size after expansion. Then, a frame memory region required for expanding image data having the image size is ensured. A JPEG expansion section 52 JPEG-expands compressed image files FL successively transferred from the header information analysis section 51 and data after the expansion is successively recorded in the frame memory region 53 ensured by the header information analysis section 51. In this case, expansion is performed by MCU (8×8 pixels), as shown in FIG. 4. Respective blocks of MCUs are successively jointed to one another, thereby expanding the whole image.

Next, a resizing section 54 magnifies/reduces the image data expanded to the frame memory region 53 to an image size required for displaying an image and performs mapping of the image data to a display frame memory 55. For example, when an image is displayed on a liquid crystal monitor built in the body of a digital still camera, the image size required for display is determined from properties of the liquid crystal monitor. When a video signal is output through an external terminal such as an AV terminal, the required image size is determined from properties of an external display device to which the signal is output. As such a known technique, a technique for having an image displayed with the size of the displayed image changed so that a frame rate of a moving picture is not reduced has been disclosed (e.g., see Japanese Laid-Open Publication No. 7-23378).

SUMMARY OF THE INVENTION

However, according to the above-described known technique, when a compressed image file is expanded and displayed, a whole original image obtained by expansion of the compressed file is temporarily stored in a frame memory. Therefore, a frame memory corresponding to the size of the original image is needed. That is, a frame memory having a large capacity is required.

This means that in an apparatus including a frame memory having a predetermined size, a compressed image file of which an original image size is larger than the predetermined size of the frame memory can not be expanded and displayed. For example, when only a frame memory for storing an image of 2,000,000 pixels is built in a digital still camera corresponding to an imaging device of 2,000,000 pixels, a compressed file of which the original image size is over 2,000,000 pixels can not be expanded and displayed. That is, expansion and display of the compressed image file is restricted by the frame memory size.

In view of the above-described problems, it is therefore an object of the present invention to largely reduce a memory capacity required for processing in expanding and displaying a JPEG compressed image file.

To solve the above-described problems, according to the present invention, when a JPEG compressed image file is expanded and a display device is made to display an image, header information of the image file is analyzed, an original image size is read, the read original image size is compared to an image size required for display by the display device, and an operation of a size ratio is performed. Then, image data is cut out from the image file by MCU and expanded, the expanded image data is magnified or reduced according to the obtained size ratio, and the magnified or reduced image data is transferred to a display frame memory.

According to the present invention, image data is cut out and expanded from a JPEG compressed image file by MCU, and the expanded image data is magnified or reduced according to a size ratio corresponding to header information and properties of the display device and is directly accumulated in the display frame memory. Thus, when an image is expanded, a whole original image does not have to be stored. Accordingly, a frame memory for storing the whole image having a large capacity, which has been conventionally needed, is no longer necessary.

Specifically, the present invention as a method for expanding a JPEG compressed image file and making a display device display an image includes: a first step of analyzing header information of the image file and reading an original image size; a second step of comparing the original image size read in the first step and an image size required for display by the display device and performing an operation of a size ratio; a third step of expanding image data of the image file by MCU; a fourth step of magnifying or reducing by MCU the image data expanded in the third step according to the size ratio obtained in the second step; and a fifth step of storing the image data obtained in the fourth step in a display frame memory. In the method, the third through fifth steps are repeatedly executed for the whole image file and then the image data stored in the display frame memory is supplied to the display device.

It is preferable that in the fourth step, a zooming function is used or thinning-out or interpolation of the image data is used.

Moreover, the present invention as a device for expanding a JPEG compressed image file and making a display device display an image includes: a header information analysis section for analyzing header information of an image file and reading an original image size while comparing the read out original image size and an image size required for display by the display device and performing an operation of a size ratio; a JPEG expansion section for expanding image data of the image file by MCU; and a resizing section for magnifying or reducing by MCU the image data expanded by the JPEG expansion section according to the size ratio obtained by the header information analysis section and transferring the magnified or reduced image data to a display frame memory.

Moreover, the present invention as a program for making a computer realize the function of expanding a JPEG compressed image file and making a display device display in which the program makes the computer realize a first function of analyzing header information of the image file and reading an original image size, a second function of comparing the original image size read by the first function and an image size required for display by the display device and performing an operation of a size ratio, a third function of expanding image data of the image file by MCU, and a fourth function of magnifying or reducing by MCU the image data expanded by the third function according to the size ratio obtained by the second function and transferring the magnified or reduced image data to a display frame memory.

According to the present invention, a JPEG compressed image is not expanded and stored to a memory for each screen but is directly recorded by MCU in a display frame memory area. Thus, a memory having a large capacity, which has been conventionally needed, is no longer necessary. Moreover, storing to a memory is performed on a small scale, so that high speed display of an expanded image becomes possible.

Moreover, the present invention is particularly effective when a system of which the memory capacity can not be changed in a simple manner is formed. For example, when a memory is built in a system LSI with some other member, the present invention is particularly effective.

DESCRIPTION OF THE PREFERRED EMBODIMENTS

Hereafter, embodiments of the present invention will be described with reference to the accompanying drawings.

Figure 1:
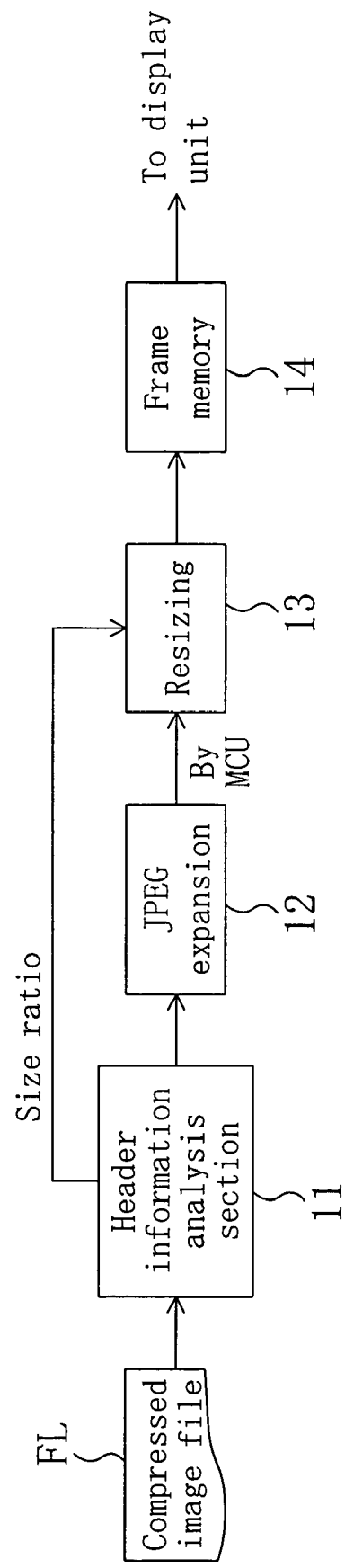
FIG. 1 is a block diagram illustrating the configuration of an image expansion and display device according to an embodiment of the present invention.

FIG. 1 is a block diagram illustrating the configuration of an image expansion and display device according to an embodiment of the present invention. In FIG. 1, FL denotes an image file which is JPEG compressed and recorded on a recording medium and the like (which will be herein referred to as a "JPEG file"), 11 denotes a header information analysis section for analyzing header information of the JPEG file FL and reads an original image size while performing an operation of a size ratio with which a compression or expansion processing is performed, 12 denotes a JPEG expansion section for cutting out image data of the JPEG file FL and JPEG expanding the data, 13 denotes a resizing section for magnifying or reducing the image data expanded by the JPEG expansion section 12 according to the size ratio obtained by the header information analysis section 11, and 14 denotes a display frame memory for accumulating image data to be displayed on a display device.

Assume that the device of FIG. 1 is provided, for example, in a digital still camera. When the digital still camera performs reproduction of an image, a CPU built in the digital still camera reads the JPEG file FL stored in a recording medium such as an SD card and a compact flash, or a frame memory built in the body of the digital still camera. Needless to say, the device of FIG. 1 may be provided in some other imaging or video apparatus than a digital still camera.

Figure 2:
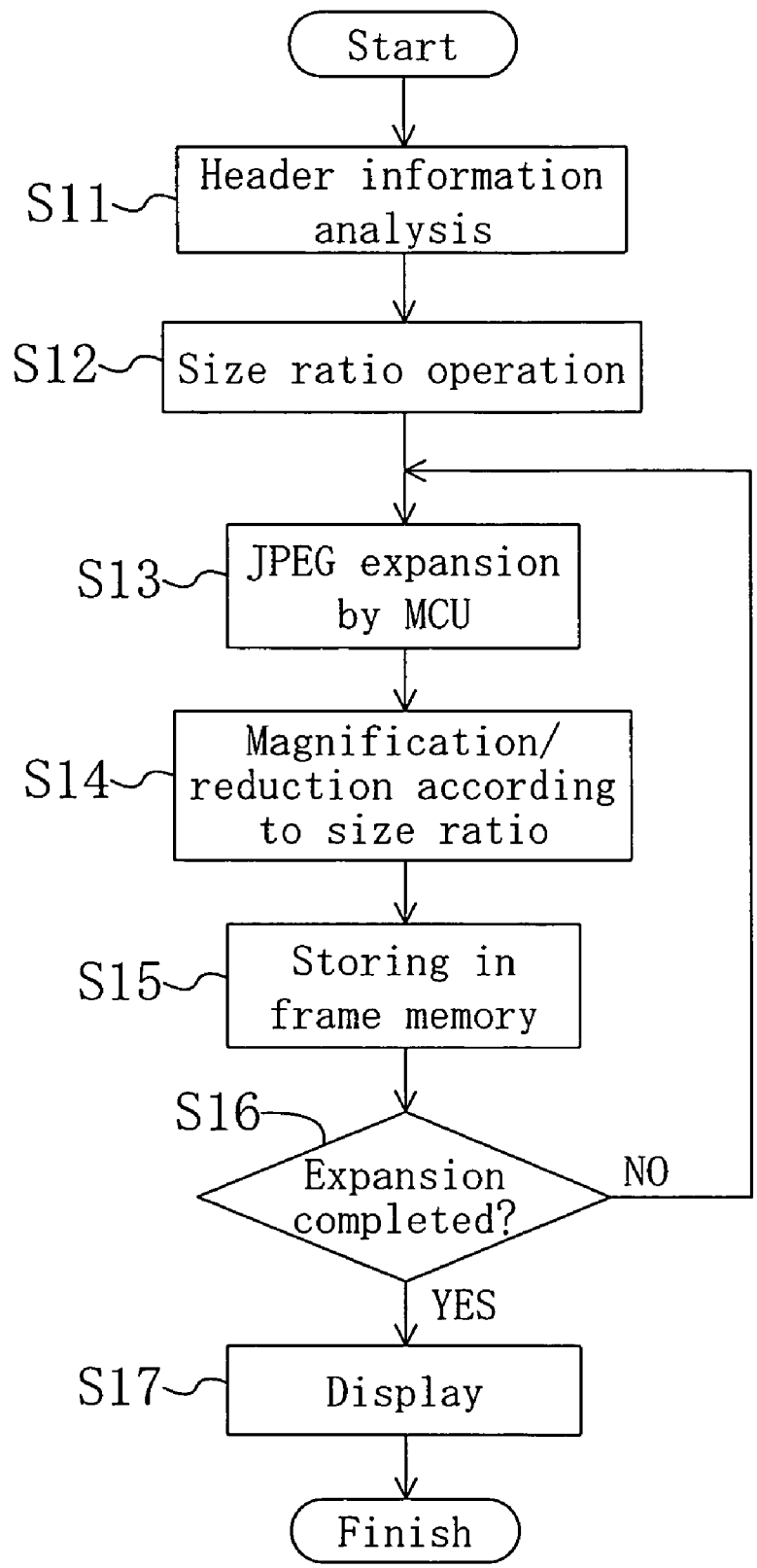
FIG. 2 is a flow chart illustrating an operation of the image expansion and display device of FIG. 1.

FIG. 2 is a flow chart illustrating the operation of the image expansion and display device of FIG. 1, i.e., an image expansion and display method according to this embodiment.

First, in Step S11, the header information analysis section 11 analyzes header information of the JPEG file FL and reads an original image size, i.e., an image size after expansion. Then, in Step S12, the header information analysis section 11 compares the original image size read in Step S11 and an image size required for display by a display device to each other and performs an operation of a size ratio to be used for later magnification/reduction processing. In this case, for example, when an image is displayed on a monitor of a digital still camera, an image size used in displaying the image is displayed on the monitor is a comparison target. Moreover, when image data is output to an external display device, an image size required for display by the display device is a comparison target.

Next, in Step S13, the JPEG expansion section 12 expands image data of the JPEG file FL by MCU (8×8=64 pixels). When expansion for a MCU is completed, in Step S14, the resizing section 13 magnifies or reduces the image data expanded by the JPEG expansion section 12 according to a size ratio obtained by the header information analysis section 11. In this case, magnification and reduction are performed using the zooming function, or thinning-out or interpolation of the image data.

After the magnification/reduction of the image data is completed, in Step S15, the resizing section 13 transfers the magnified/reduced image data to the display frame memory 14. The transferred image data is temporarily held in the display frame memory 14. Then, Steps S13 through S15 are repeatedly executed, and when processing of the whole JPEG file FL is completed (Yes in S16), in Step S17, the image data stored in the display frame memory 14 is output to a display device.

Figure 3:
FIG. 3 is a conceptual illustration for comparing required memory capacities in an embodiment to that in a known device.
Figure 3:
Figure 4:
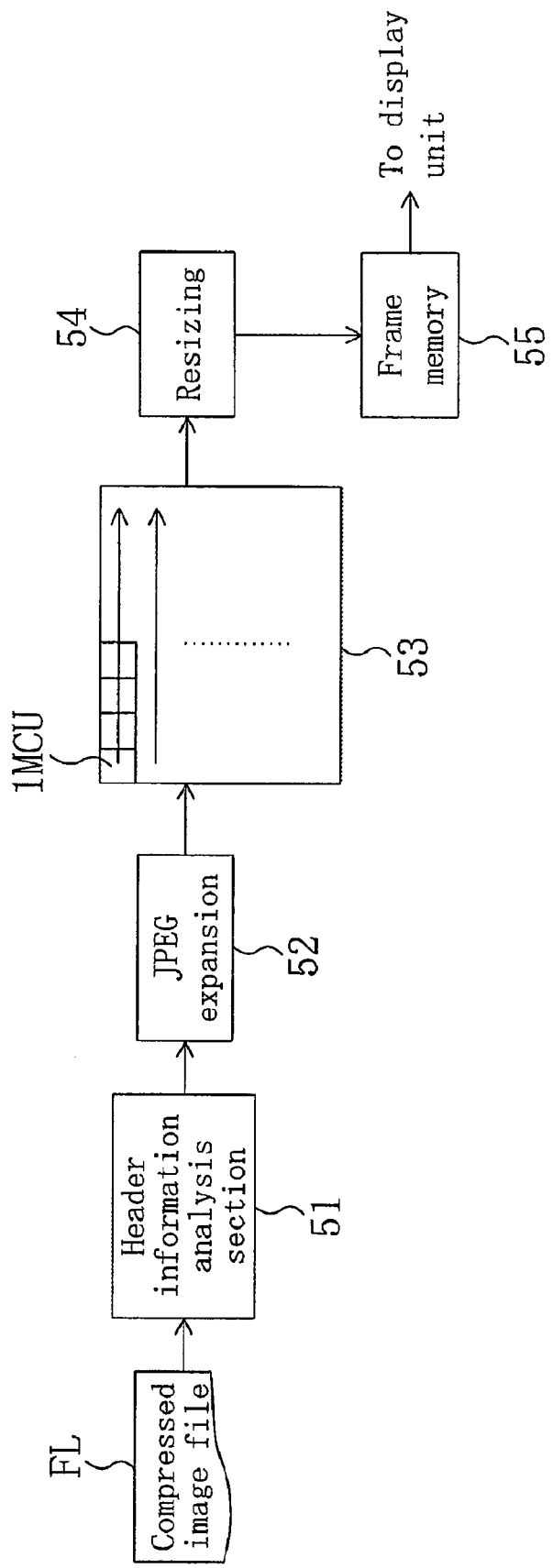
FIG. 4 is a block diagram illustrating the configuration of a known image expansion and display device.

FIG. 3 is a conceptual illustration for comparing required memory capacities in this embodiment to that in a known device. In FIG. 3, A denotes a memory capacity of the frame memory 14, i.e., a memory capacity required for finally performing display, B denotes a memory capacity required for storing JPEG expanded image data by MCU, and C denotes a required capacity when the whole image of a JPEG file is expanded and stored in the known technique. In the known technique, as shown in C, an enormous amount memory capacity has been required. In contrast, however, a very small memory capacity is required in this embodiment, as shown in B.

Note that the present invention may be used with the known technique.

Moreover, the present invention may be realized by forming all of the configuration as hardware, or part or all of the configuration as software. When the inventive device is configured by hardware, even higher speed processing can be achieved. Moreover, by using a program, the function of an image expansion and display device according to the present invention may be realized by a computer.

What is claimed is:

1. A method for expanding a JPEG compressed image file to display it on a display unit, the method comprising:
   a first step of analyzing header information of the image file and reading an original image size;
   a second step of comparing the original image size read in the first step and an image size required for display on the display unit and performing an operation of a size ratio;
   a third step of expanding image data of the image file by MCU;
   a fourth step of magnifying or reducing by MCU the image data expanded in the third step according to the size ratio obtained in the second step; and
   a fifth step of storing the image data obtained in the fourth step in a display frame memory,
   wherein the third through fifth steps are repeatedly executed for the whole image file and then the image data stored in the display frame memory is supplied to the display unit and the fourth step is performed without recording an expanded whole image in a memory.

2. The method of claim 1, wherein in the fourth step, a zooming function is used.

3. The method of claim 1, wherein in the fourth step, thinning-out or interpolation of the image data is used.

4. A device for expanding a JPEG compressed image file to display it on a display unit, the device comprising:
   a header information analysis section for analyzing header information of the image file and reading an original image size while comparing the read out original image size and an image size required for display on the display unit and performing an operation of a size ratio;
   a JPEG expansion section for expanding image data of the image file by MCU; and
   a resizing section for magnifying or reducing by MCU the image data expanded by the JPEG expansion section according to the size ratio obtained by the header information analysis section and transferring the magnified or reduced image data to a display frame memory,
   wherein the image data expanded by the JPEG expansion section is magnified or reduced by the resizing section without recording an expanded whole image in a memory.

5. A computer-readable medium storing a program for causing a computer to perform the function of expanding a JPEG compressed image file to display it on a display unit, wherein the program, when executed by the computer, causes the computer to perform:
   a first function of analyzing header information of the image file and reading an original image size,
   a second function of comparing the original image size read by the first function and an image size required for display on the display unit and performing an operation of a size ratio,
   a third function of expanding image data of the image file by MCU, and
   a fourth function of magnifying or reducing by MCU the image data expanded by the third function according to the size ratio obtained by the second function and transferring the magnified or reduced image data to a display frame memory,
   wherein the image data expanded by the third function is magnified or reduced without recording an expanded whole image in a memory.

* * * * *